United States Patent [19]
Tedeschi, Jr. et al.

[11] Patent Number: 6,065,651
[45] Date of Patent: May 23, 2000

[54] CLOSABLE DISPENSER AND DISPENSING APPARATUS

[75] Inventors: Thomas Tedeschi, Jr., Brewster, N.Y.; Stephen P. Belko, Blackwood, N.J.

[73] Assignee: Kraft Foods, Inc., Northfield, Ill.

[21] Appl. No.: 09/138,505

[22] Filed: Aug. 24, 1998

[51] Int. Cl.[7] ......................................................... B67D 3/00
[52] U.S. Cl. .......................... 222/519; 222/520; 222/521; 222/575
[58] Field of Search .............................. 222/92, 107, 519, 222/520, 521, 524, 575

[56] References Cited

U.S. PATENT DOCUMENTS

| | | | |
|---|---|---|---|
| 2,157,891 | 5/1939 | Godfrey | 222/519 |
| 2,441,649 | 5/1948 | Sprague | 222/575 |
| 2,550,572 | 4/1951 | Loomis | 222/519 |
| 3,058,631 | 10/1962 | De La Hitte | 222/507 |
| 3,123,259 | 3/1964 | Musel et al. | 222/521 |
| 3,157,312 | 11/1964 | Kitterman | 222/1 |
| 3,489,323 | 1/1970 | Hug | 222/402.16 |
| 3,598,285 | 8/1971 | Stull | 222/521 X |
| 3,981,421 | 9/1976 | McDowell, Jr. et al. | 222/521 |
| 4,732,299 | 3/1988 | Hoyt | 222/94 |
| 4,826,055 | 5/1989 | Stull | 222/575 X |
| 5,257,865 | 11/1993 | Tani | 383/78 |
| 5,772,076 | 6/1998 | Juk et al. | 222/521 X |

Primary Examiner—Gregory L. Huson
Assistant Examiner—Thach Bui
Attorney, Agent, or Firm—Thomas R. Savoie; Thomas A. Marcoux

[57] ABSTRACT

A closable dispenser and an apparatus for dispensing a flowable product therewith are provided. The apparatus for dispensing includes a collapsible product container. The closable dispenser includes an outlet member having a base and a 3-D tip having a 3-D opening therein. The dispenser also includes a spout member having a hollow main body fixed to the container, a stopper extending from the main body and having a 3-D shape complementary to the 3-D opening of the tip, and a passage between the main body and the stopper. A mounting mechanism movably mounts the base of the outlet member about the main body of the spout member for a relative movement of the outlet member and spout member between (a) an open position allowing flow of the product where the stopper is spaced interiorly from the 3-D opening and dispensing of the product through the passage to the 3-D opening is permitted and (b) a closed position preventing flow of the product where the stopper is complementarily engaged with the 3-D opening of the tip so that most residual product is expelled from said tip and a 3-D surface which is easily cleaned of remaining residual product is provided. Preferably, the 3-D tip of the outlet member has an outer convex shape and an inner concave shape, and the 3-D shape of the stopper is convex. In addition, the 3-D opening of the tip is a plurality of slots radiating away from a central aperture at an apex of the tip.

18 Claims, 7 Drawing Sheets

CLOSABLE DISPENSER AND DISPENSING APPARATUS

FIELD OF THE INVENTION

The present invention relates generally to closable dispensers and dispensing apparatuses for dispensing a flowable product from a container, and more particularly to a decorative dispenser having a three-dimensional tip and tip opening as well as a three-dimensional stopper for the opening to provide a wide three dimension opening when flow is desired and to provide a three dimensional surface which is easily cleaned of residual product when the dispenser is closed to prevent leakage therefrom.

BACKGROUND OF THE INVENTION

Various closable dispensers are known in the art which permit flow of a flowable product from a container when an outlet member and a spout member are in an open position and which prevent flow of the flowable product from the container when the outlet member and spout member are in a closed position. The outlet member and spout member are moved relative to one another to move them between the open and closed positions, either reciprocally (by a push-pull) or screwably (by a twist). Typical of the push-pull type of dispensers are those used for water bottles, syrup and the like where a cylindrical sleeve with a circular opening at the top is moved into and away from the top of a cylindrical post. Typical of the twist type of dispensers are those used for mustard and the like where a conical sleeve with a circular opening at the top is screwed into and away from the top of a cylindrical post. In both of these types of dispensers, there is a plug type of action provided by the cylindrical post as it passes through the two dimensional circular opening.

While such dispensers are satisfactory for relatively flowable products, they are not satisfactory for relatively viscous products which are to be extruded in rope form and with a decorative (e.g. fluted) shape, such as might be desired for frosting or whipped topping. The two dimensional openings provided by such prior art dispensers are generally not sufficient for such flow of a viscous product.

SUMMARY OF THE INVENTION

In accordance with the present invention, a closable dispenser and an apparatus for dispensing a flowable product (particularly a viscous product) with a closable dispenser are provided. The apparatus for dispensing the flowable product includes a product container in which the flowable product is located. The product container has an open mouth and is preferably collapsible to drive the product from the container and out of the mouth in a stream. The closable dispenser is thus used for dispensing a stream of the product from the container when the container is collapsed. The dispenser includes an outlet member having a base and a three-dimensional (hereafter "3-D") tip having a 3-D opening therein. The dispenser also includes a spout member having a hollow main body which is fixed relative to the mouth of the container, a stopper extending from the main body and having a 3-D shape complementary to the 3-D opening of the tip, and a passage provided between the main body and the stopper. A mounting means of the dispenser movably mounts the base of the outlet member about the main body of the spout member for a relative movement of the outlet member and spout member between (a) an open position allowing flow of the product where the stopper is spaced interiorly and widely from the 3-D opening so that dispensing of the product from the mouth of the container through the passage to the 3-D opening is permitted and (b) a closed position preventing flow of the product where the stopper is complementarily engaged with the 3-D opening of the tip so that most residual product is expelled from the tip and a 3-D surface which is easily cleaned of any remaining residual product is provided.

Preferably, the 3-D tip of the outlet member has an outer convex shape and an inner concave shape, and then the 3-D shape of the stopper is convex. In addition, the 3-D opening of the tip of the outlet member is a plurality of slots radiating away from a central aperture provided at an apex of the tip.

In one preferred embodiment, the stopper is a solid dome. In another embodiment, the stopper is hollow with an outwardly convex shape, and the outward convex shape has a series of cutouts provided between strips of the convex stopper. With these cutouts, flow of the product past the convex stopper and through the 3-D opening is facilitated when the base and the main body are in the open position.

In an alternative preferred embodiment, the 3-D shape of the stopper is a plurality of flexible ribs, with each the rib blocking a respective slot when the base and the main body are in the closed position. Preferably, outer portions of the ribs are flush with an adjacent outer convex shape of the tip when the ribs block the slots.

In each embodiment, the stopper is preferably mounted to the main body by a plurality of legs with spaces between the spaces providing the passage for the product. In addition, the mounting means mounts the base of the outlet member either for a screw twist rotation about the main body of the spout member or for a reciprocating movement along the main body of the spout member.

In the preferred embodiments, a breakable tamper-evidencing device connecting the base of the outlet member and the main body of the spout member is provided such that when the base and the main body are first moved from the closed position in which the dispenser is provided to the open position, the tamper-evidencing device is broken. In addition, a lower portion of the main body of the spout member is preferably canoe-shaped in cross section, with this canoe shape including a central inlet or bore which is circular and a series of flanges radiating on either side of the central inlet to a respective tip of the canoe shape.

In the preferred embodiment of the apparatus, the container is an elongate plastic sleeve having the mouth at one longitudinal end thereof, and the flowable product is relatively viscous.

It is an object of the present invention to provide a closable dispenser which provides a decorative effect to a stream of the product dispensed thereby.

It is also an object of the present invention to provide a 3-D tip with a wide 3-D opening and an effective closure therefor as well as to prevent leakage of the flowable product when the outlet member and spout member are in the closed position.

It is a further object of the present invention to provide a closable dispenser which acts as a plug to push most product remaining in the opening of the outlet member from the opening when the outlet member and spout member are moved to the closed position so that cleaning of product from the opening is easy and effective as well as sanitary.

It is yet another object of the present invention to provide an apparatus for containing a flowable product which includes a closable dispenser for selectively dispensing the product from the container in a decorative form and for subsequently closing of the dispenser to seal the remaining product in the container.

Other features, advantages and objects of the present invention are stated in or apparent from the detailed description of presently preferred embodiments of the invention found hereinbelow.

DESCRIPTION OF THE PREFERRED EMBODIMENTS

Figure 1:
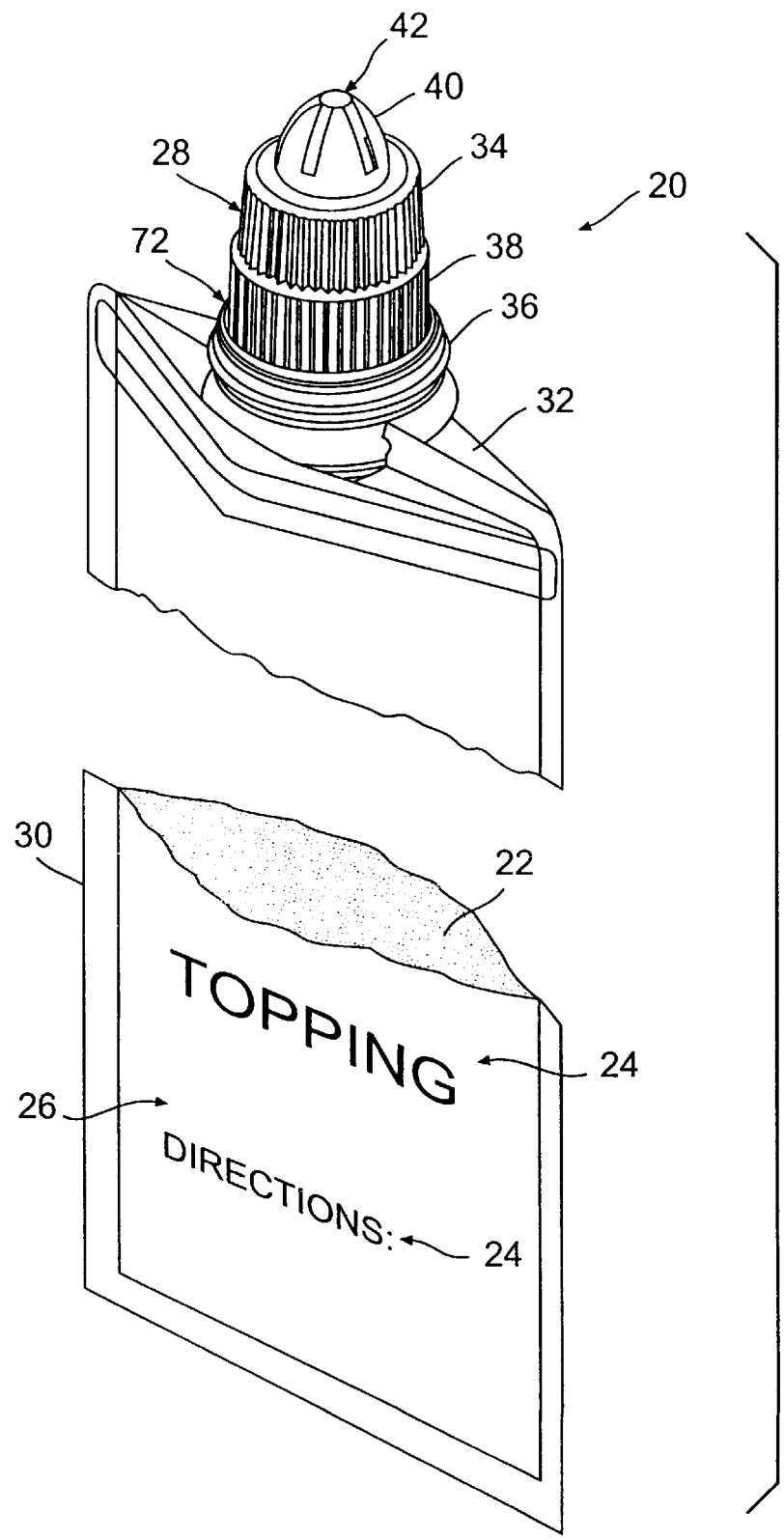
FIG. 1 is a front-top-right perspective view of an apparatus for storing and dispensing of a product including a first embodiment of a closable dispenser according to the present invention.

With reference now to the drawings in which like numerals represent like elements throughout the views, an apparatus 20 for the storage and dispensing of a flowable product 22 is depicted in FIG. 1. Flowable product 22 is preferably a relatively viscous product such as COOL WHIP® whipped topping which can be retain a decorative form when dispensed or extruded as a stream. Apparatus 20 is preferably provided with suitable indicia 24 (trademarks, labeling information, directions for use, etc.) and is delivered to the consumer in the self-contained form depicted. Broadly, apparatus 20 is formed of a product container 26 in which flowable product 22 is suitably retained and a closable dispenser 28. Product container 26 is conveniently a collapsible plastic sleeve or bag 30 which functions initially as a storage container and then like a pastry bag when dispensing is desired. Sleeve 30 can take any desired shape, and is closed around the periphery thereof except where an open mouth 32 is provided in which dispenser 28 is located. Dispenser 28 is suitably sealed in mouth 32 by any of many means well known in the art. With apparatus 20, flowable product 22 is thus extruded through dispenser 28 (as explained below) by progressive collapsing of elongate sleeve 30 so that the user can apply a decorative stream of product 22 as desired in the same manner as a stream of product is delivered from a pastry bag.

Figure 2:
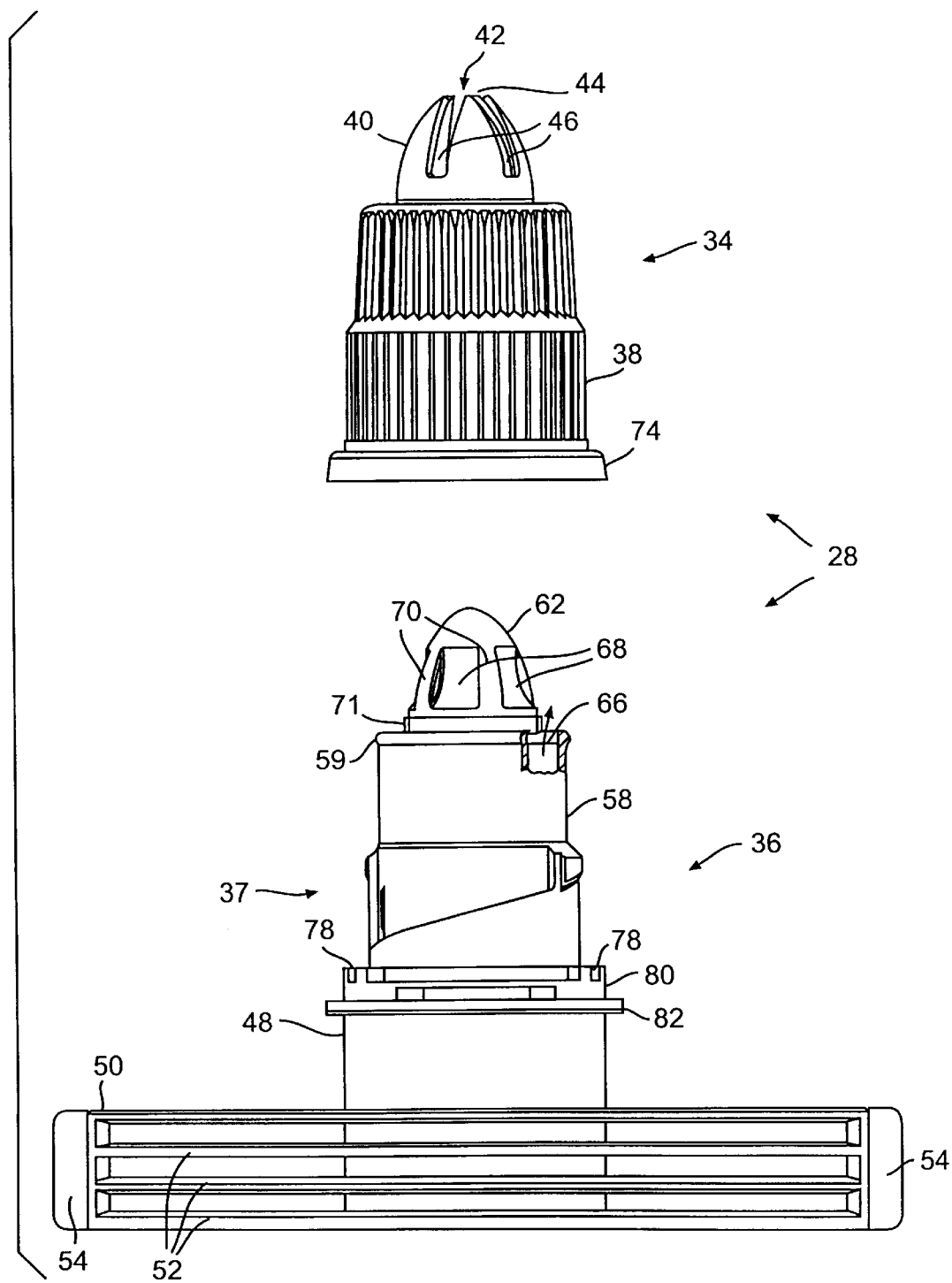
FIG. 2 is an exploded front elevation view of the first embodiment of the dispenser depicted in FIG. 1.
Figure 3:
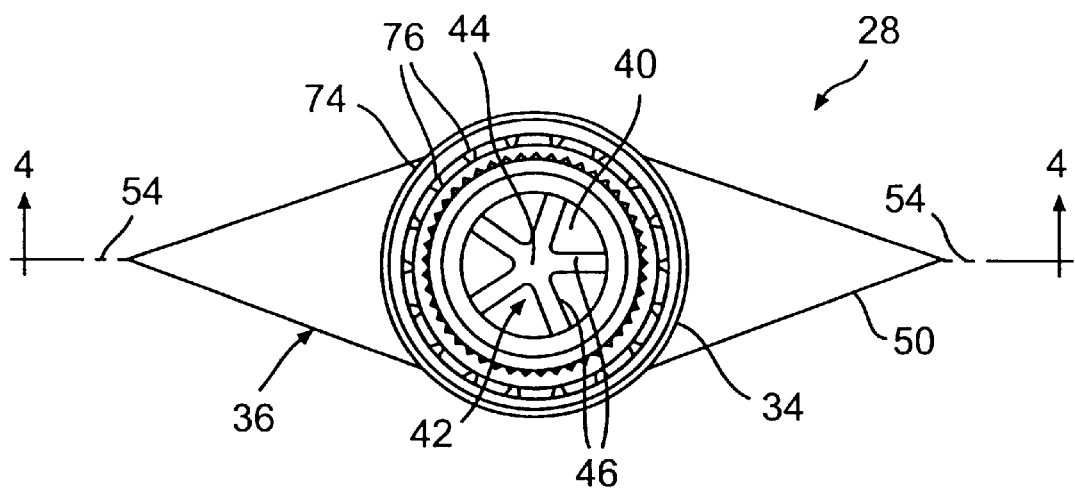
FIG. 3 is a top view of the dispenser depicted in FIG. 1.
Figure 4:
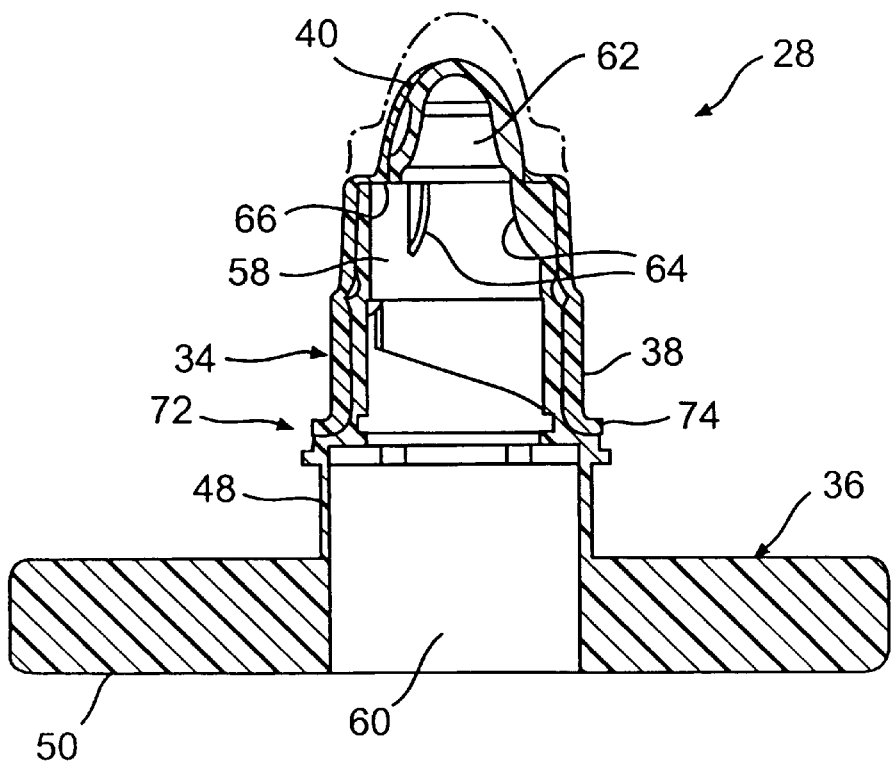
FIG. 4 is a cross-sectional view of the dispenser depicted in FIG. 1 taken along the section line 4—4 in FIG. 3.

Closable dispenser 28 is broadly formed of two elements, an outlet member 34 and a spout member 36 as shown in greater detail in FIGS. 2–4. Outlet member 34 and spout member 36 are moved longitudinally relative to one another by a suitable mounting means 37. As shown in FIG. 4, an open position of outlet member 34 is shown in a broken line spaced from a closed position shown in a full line. Mounting means 37 is preferably an adjustable twist lock mechanism as disclosed in U.S. Pat. No. 4,967,941 (Beck) to Creative Packaging Corp. of Wheeling Ill. (hereby incorporated by reference) and which is commercially available. As mounting means 37 is old in the art, no detailed discussion is required. However, it should be noted that mounting means 37 thus provides that a screw twist rotation of outlet member 34 relative to spout member 36 results in a longitudinal movement of outlet member 34 relative to spout member 36 and that the degree of movement, especially in the fully closed and opened positions, is palpable due to the provision of detents.

Outlet member 34 includes a base 38 and a 3-D tip 40 having a 3-D opening 42 therein. The general shape of tip 40 is preferably peaked outward to provide the 3-D nature, though as will become evident it could be peaked inward for the same advantages if desired. The particular 3-D shape of tip 40 and hence of opening 42 therein is selected as desired, being preferably bullet or dome shaped, that is curved towards an apex such as provided by a conicoid or other 3-D curved portions. Thus, the general shape of tip 40 is an outer convex shape and an inner concave shape. Opening 42 is preferably formed by a central aperture 44 at the longitudinal distal end or apex of tip 40 and five slots 46 radiating away from central aperture 44, giving opening 42 a generally fluted or open petal shape. Base 38 is provided with a series of alternating ridges and grooves thereabout which are typical in the art in order to provide for better gripping by the fingers when a twist rotation is required to effect the movement determined by mounting means 37. It will be appreciated by those of ordinary skill and as shown in the prior art that a complementary portion of mounting means 37 is provided on the inside surface of base 38 even though this is not shown in detail.

Spout member 36 includes a hollow main body 48 which is fixed in or relative to mouth 32 of sleeve 30 in any suitable manner known in the art, as by gluing or heat sealing. For this purpose, main body 48 includes a lower portion 50 which is preferably canoe-shaped in radial cross section. Lower portion 50 also includes a series of ribs or flanges 52 formed in the surrounding surface of lower portion 50 and respective tips 54 at the ends of flanges 52, to both of which sleeve 30 is suitably sealed.

Above lower portion 50, main body 48 includes a pedestal 58 which is generally circular in radial cross section and which includes a mating portion of mounting means 37 to that provided inside of base 38. Pedestal 58 also includes a seal ring 59 which slidably engages an adjacent portion of base 38 at all times. Inside of pedestal 58 and continued in lower portion 48 is a central inlet or bore 60 through which flowable product 22 is conducted as discussed subsequently.

Spout member 36 also includes a stopper 62. Stopper 62 is mounted above pedestal 58 in the center of bore 60 by a plurality (three in this embodiment) of integral legs 64. It will thus be appreciated that a passage 66 for flowable product 22 is formed from bore 60 to the outside of stopper 62 by the openings between legs 64. Stopper 62 has a 3-D outer surface shape which is complementary (in this case convex or domed) to the 3-D shape of 3-D opening 42 as defined in this embodiment by the inside surface of tip 40. Stopper 62 also has a bottom seal collar 71 which is matingly shaped with a lower portion of tip 40 below opening 42. These mating portions form an additional means to prevent access to product 22 in sleeve 30 when dispenser 28 is in the closed position.

The 3-D nature of tip 40 and opening 42 as well as of the outer surface of stopper 62 is manifested in the fact that the stream of product produced by collapsing of sleeve 30 results from opening 42 which extends in all three dimensions, rather than two dimensions typical of the flat (typically circular) openings of prior art dispensers (such as the Beck patent noted above) previously used for flowable products (water, syrup, mustard, etc.). The provision of such a 3-D tip 40 and opening 42 provides an immediate and wide opening between stopper 62 and tip 40 with little relative (twist) movement effected by mounting means 37, and facilitates the extrusion of flowable produce 22 through central aperture 44 and slots 46 of opening 42. Further, the more relative (twist) movement between stopper 62 and tip 40, the wider the opening therebetween progressively becomes.

In order to increase the ease of flow of viscous product 22 between stopper 62 and tip 40 and hence through opening 42, a series of cutouts 68 may be provided in the outer convex shape of stopper 62. These cutouts are provided above bottom seal collar 71 and between adjacent strips 70, with the number (five) of strips 70 matching the number (five) of slots 46.

In a preferred embodiment, dispenser 28 also includes a tamper-evidencing mechanism or device 72 for indicating whether apparatus 20 has been opened or tampered with prior to the first use by the user. Tamper-evidencing device 72 is well known in the art, and may include a small ring 74 attached to the bottom of base 38 of outlet member 34 by a series of tiny bridging pieces which are easily broken. Ring 74 is held non-rotatably in place relative to main body 48 of spout member 36 because of the presence of a series of grooves 78 provided in a shoulder 80 of main body 48 at each side thereof with the same spacings as the bridging pieces. When outlet member 34 is first placed on spout member 36 just above ridge 82, respective bridging pieces nest in respective grooves 78. Thus, any rotation of outlet member 34 relative to spout member 36 using mounting means 37 is initially allowed only after the bridging pieces all break away from base 38 of outlet member 34.

In operation, apparatus 20 functions in the following manner. Initially, it will be appreciated that apparatus 20 is provided to the user or consumer in a store in the form depicted in FIG. 1. The user thus purchases apparatus 20, or first uses apparatus 20, after checking to see if tamper-evidencing device 72 has been tampered with. Assuming no tampering is evident, the user initially twists outlet member 34 relative to spout member 36 by gripping of base 38 and lower portion 50. This causes tamper-evidencing elements, such as bridging pieces, to break when twisting first begins, and then mounting means 37 causes outlet member 34 to move longitudinally away from spout member 36 from a closed position as depicted in FIGS. 1 and 3 to an open position depicted in a broken line in FIG. 4. In the closed position, it will be appreciated that product 22 in container 26 is protected from the outside environment by engagement of seal collar 71 with the surrounding portion of tip 40 and by the engagement of seal ring 59 with the adjacent portion of base 38.

When apparatus 20 is in the open position, container 26 is squeezed by the user to force product 22 from tip 40. Product 22 thus flows from container 26, up through bore 60 in main body 48 and pedestal 58 of spout member 36, through passage 66 provided between stopper 62 and pedestal 58, around the outside of stopper 62 and inside of tip 40, and finally out of opening 42 forming a decorative stream provided by central aperture 44 and slots 46. It will be appreciated that the flow of product 22 around stopper 62 may be facilitated or eased by the presence of cutouts 68 provided in the outside surface of stopper 62. It will also be appreciated that the flow of product 22 in the opposite direction from stopper 62 (down between pedestal 58 and base member 38) is prevented when dispenser 28 is in the open position by the engagement of seal ring 59 with the adjacent portion of base 38.

After the user has expelled a desired amount of product 22 from tip 40, product 22 is again sealed in container 26 by moving outlet member 34 back to the closed position using an opposite twisting motion of outlet member 34 relative to spout member 36. As this occurs, any product remaining in the volume between stopper 62 and tip 40 is mostly expelled from opening 42 as stopper 62 fits snugly inside of tip 40. This configuration thus presents an easily cleanable surface, such as by rinsing. It will be appreciated that strips 70 of stopper 62 could be moved into a position immediately adjacent or underneath of respective slots 46 when the closed position is reached so that cutouts 68 are hidden from view and strips 70 help to push any product present in slots 46 therefrom. Alternatively, cutouts 68 may be positioned underneath respective slots 46 in order to facilitate cleaning of residual products. The slight (residual) amount of product remaining in slots 46 is easily wiped, licked or otherwise removed therefrom, so tip 40 is easily cleaned after use to present a sanitary and hence appealing appearance to the user. Apparatus 20 is then suitably stored until a reuse is desired.

Figure 5:
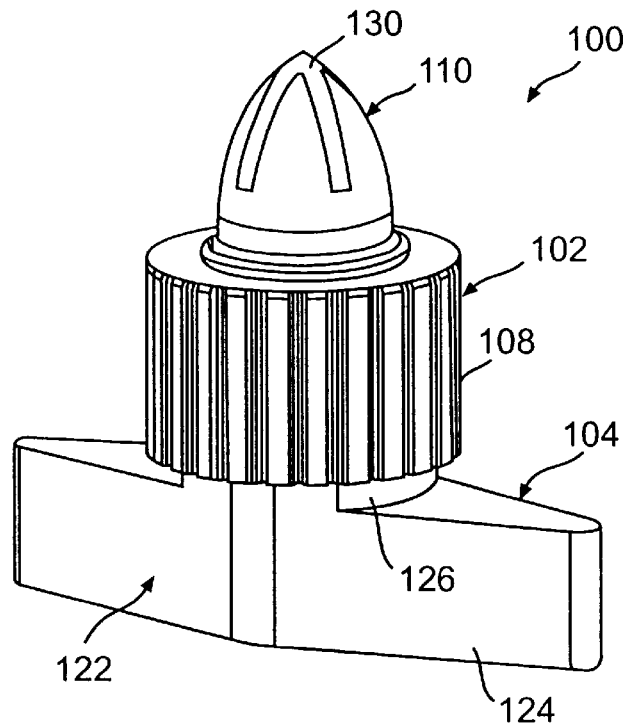
FIG. 5 is a front-top-right perspective view of a second embodiment of a dispenser according to the present invention.
Figure 6:
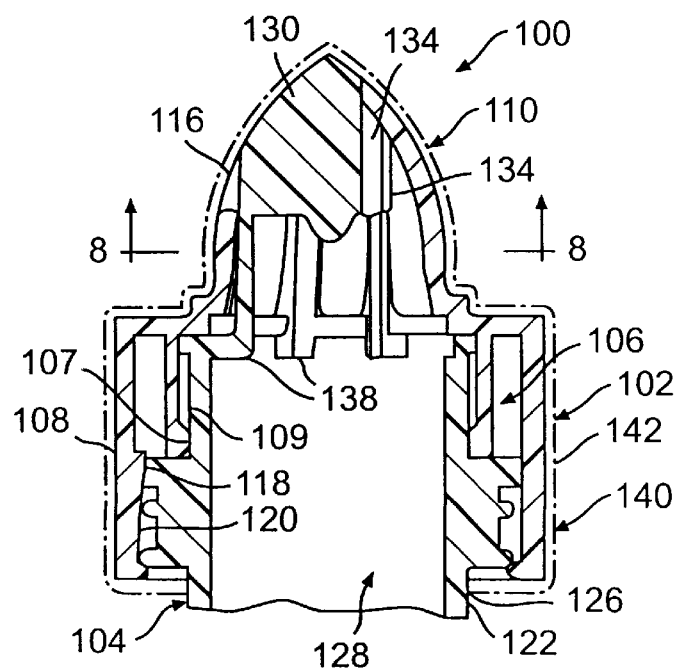
FIG. 6 is a cross-sectional view of an upper portion of the dispenser depicted in FIG. 5 in a closed position.
Figure 7:
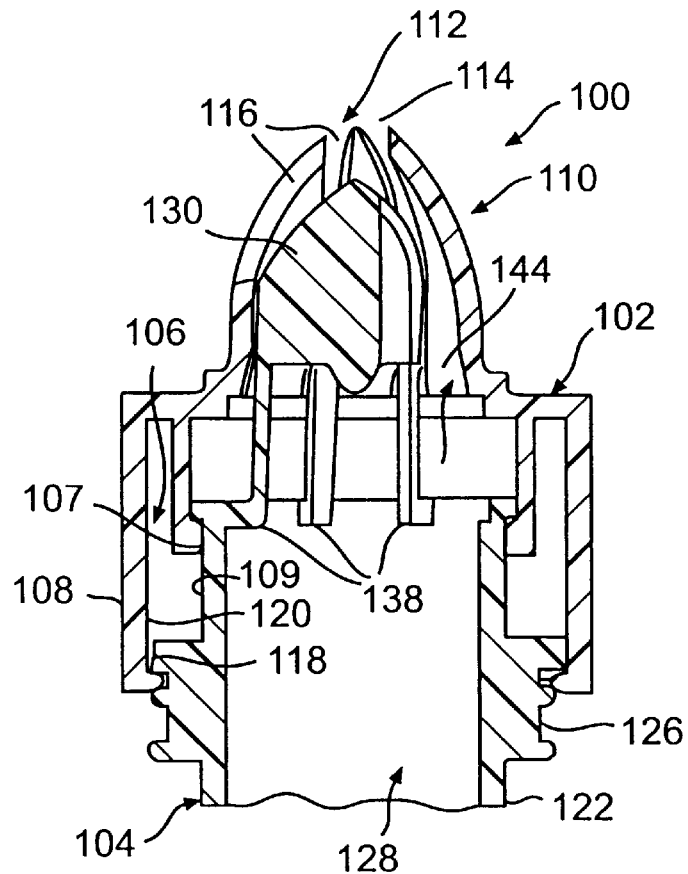
FIG. 7 is a cross-sectional view of an upper portion of the dispenser depicted in FIG. 5 in an open position.
Figure 8:
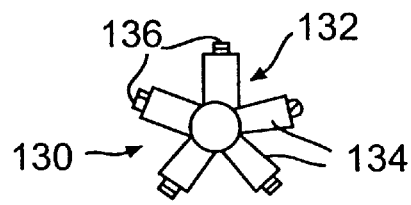
FIG. 8 is a cross-sectional view of the stopper depicted in FIG. 6 taken along the section line 8—8.

Depicted in FIGS. 5–8 is a second embodiment of a closable dispenser 100 which could be used in place of dispenser 28 with container 26. Dispenser 100 is also formed of two elements, an outlet member 102 and a spout member 104. Outlet member 102 and spout member 104 are moved longitudinally relative to one another by a suitable mounting means 106. A closed position of dispenser 100 is depicted in FIG. 6, and an open position is depicted in FIG. 7. It will be noted that in either position a seal is provided be therebetween by seal collar 107 and mating surface 109.

In this embodiment, mounting means 106 is a non-rotatable push-pull or reciprocating lock mechanism well known in the art and commercially available. A suitable push-pull mechanism is broadly disclosed as prior art in U.S. Pat. No. 3,981,421 (McDowell, Jr. et al.) to The Procter & Gamble Co. As mounting means 106 is old in the art, no detailed discussion is required. However, it should be noted that mounting means 106 thus provides that a longitudinal push (to close) or pull (to open) results in a longitudinal movement of outlet member 102 relative to spout member 104, and that this movement is made while rotation of outlet member 102 relative to spout member 104 is precluded. Precluding such a relative rotation is easily provided, as known in the art, by providing at least one longitudinal guide groove 118 and a mating longitudinal guide rib 120 (and preferably more than one, such as four) which slide and interact with one another during longitudinal movement to prevent any relative rotational movement.

Outlet member 102 of dispenser 100 includes a base 108 and a 3-D tip 110 having a 3-D opening 112 similar to 3-D tip 40 and opening 42. Opening 112 includes a central aperture 114 and five slots 116 radiating away from aperture 114. Spout member 104 includes a hollow main body 122 having a lower portion 124 which is canoe-shaped similar to lower portion 50 of main body 48 but shown here without flanges 52. Main body 122 also includes a pedestal 126 above lower portion 124. A central inlet or bore 128 extends centrally in spout member 104 through which the product will flow.

Spout member 104 also includes a stopper 130 located above pedestal 126 in the middle of bore 128. The 3-D shape of stopper 130 is primarily formed by a central star portion 132 (as shown best in FIG. 8) formed by radially extending and convexly curved arms 134. Integrally formed at the end of each arm 134 is a smaller outstanding rib 136. It will be appreciated that arms 134 and ribs 136 curve upwards together toward the distal peak of stopper 130. Each rib 136 is extended in the opposite (proximal or interior) direction to form a leg 138 which is integrally connected to the top of pedestal 126 as shown to mount stopper 130 in the center of bore 128 above pedestal 126.

When outlet member 102 and spout member 104 are in the closed position, arms 134 totally block associated slots 116 along the entire length thereof and at the same time ribs 136 fill associated slots 116, except for a small portion at the lower end of each slot due to the clearance needed for ribs 136 during the longitudinal relative movement. Thus, in the closed position, outer portions of each rib 136 are flush with the majority of the adjacent outer convex shape of tip 110. This flushness provides an easy wipeable or cleanable surface as well as a smooth and appealing appearance.

Dispenser 100 also preferably includes a tamper-evidencing device 140. In this embodiment, tamper-evidencing device is a shrink-wrap cover 142 provided over outlet member 102 as shown schematically by a dot-dash line FIG. 6. Cover 142 is known in the art and is easily broken and removed when outlet member 102 is to be used.

In operation, dispenser 100 functions in the following manner. Initially, it will be appreciated that mounting means 106 is formed so that each rib 136 is located so as to fill a respective slot 116 when dispenser 100 is in the closed position as shown in FIGS. 5 and 6 and cover 142 is in place. Thus, dispenser 100 and the associated container (not shown) are purchased by the user in the form depicted in FIG. 6 with opening 112 substantially filled and sealed by the presence of ribs 136 in respective slots 116 and in central aperture 114. The user can check to see if tamper-evidencing device 140 has been tampered with or other tampering is evident by viewing of cover 142.

When it is desired to expel a stream of product through dispenser 100, base 108 of outlet member 102 is grasped by the user in one hand while main body 122 of spout member 104 is held with the other hand. By a suitable pull movement, outlet member 102 is moved longitudinally relative to spout member 104 so that stopper 130 is moved away from opening 112. As outlet member 102 and spout member 104 are moved to the open position by the relative longitudinal movement thereof, ribs 136 filling respective slots 116 and arms 134 covering slots 116 are moved away from slots 116. This movement of ribs 136 provides a passage 144 around ribs 136 as well as between arms 134 for the product stream to be expelled from bore 128 through opening 112. The presence of the area between arms 134 is especially advantageous for a viscous product as it provides a much larger passage cross section. As known in the art, mounting means 106 provides a tactile feel when outlet member 102 and spout member 104 reach the opened or closed positions, as well as a locking mechanism for positively maintaining the opened or closed positions (via the various known flanges shown but not further described).

When the user has completed expelling a desired amount of product from tip 110, the product is again sealed by moving outlet member 102 back to the closed position by a longitudinal movement thereof relative to spout member 104. As this movement occurs, any product remaining in the volume between ribs 136 and associated slots 116 is expelled as ribs 136 move snugly into and seal associated slots 116 up to the outer convex shape of tip 110. The slight amount of product adhering to tip 110 is then easily cleaned away from the wipeable surface thus provided, leaving an essentially smooth tip due to the flush mounting of ribs 136 in slots 116. Dispenser 100 is then ready for a reuse as desired.

Figure 9:
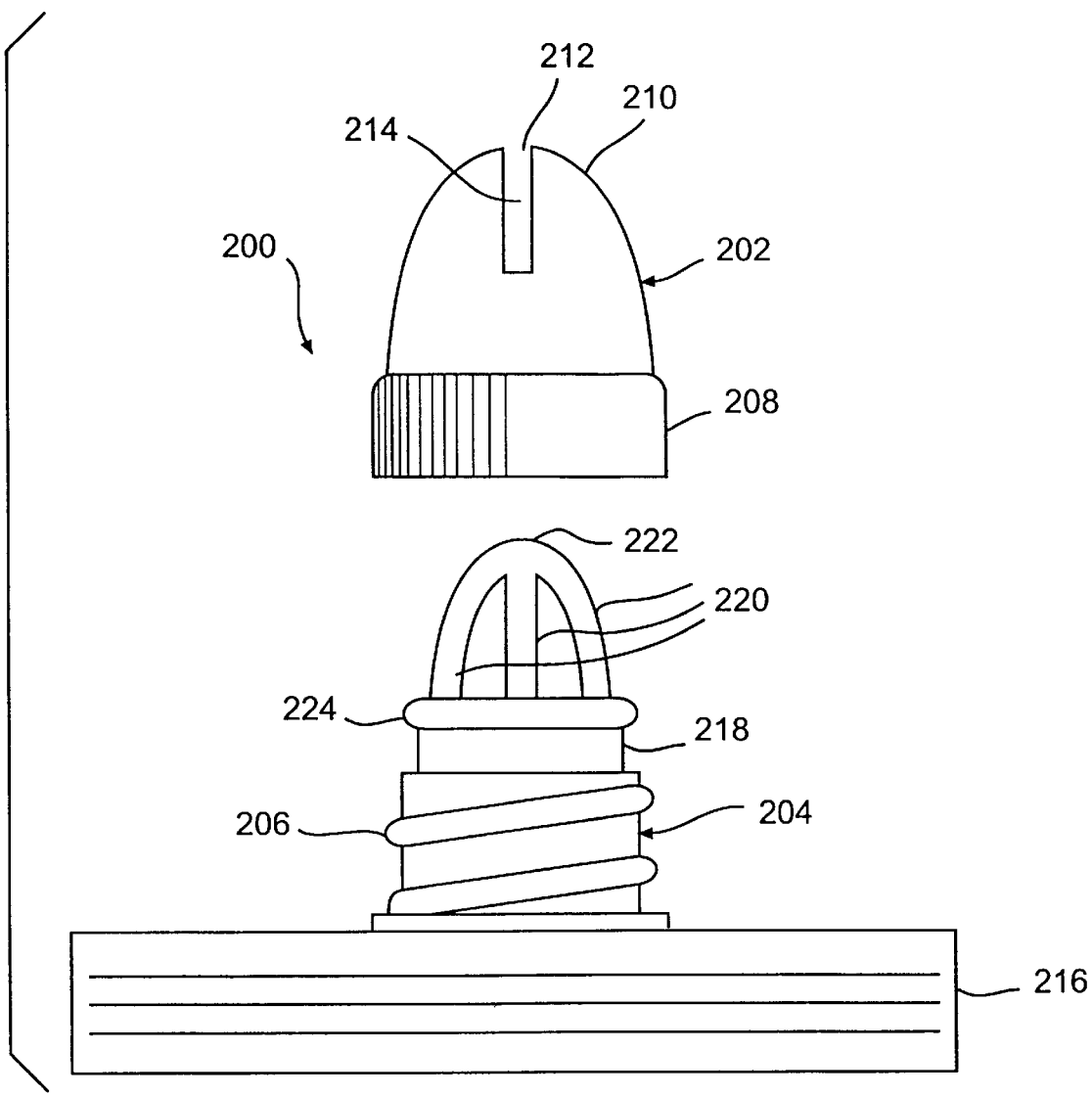
FIG. 9 is an exploded front elevation view of a third embodiment of a dispenser according to the present invention.
Figure 10:
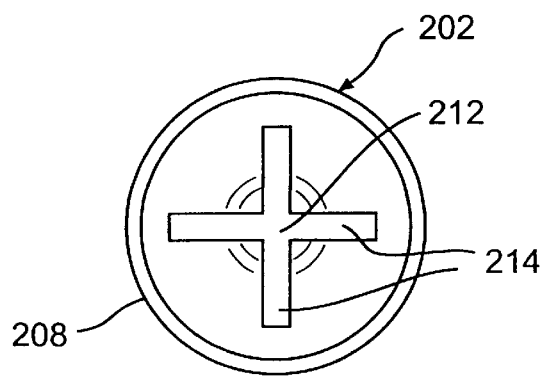
FIG. 10 is a top view of the outlet member depicted in FIG. 9.

Depicted in FIGS. 9–10 is a third embodiment of a dispenser 200. Dispenser 200 includes an outlet member 202 and a spout member 204. Outlet member 202 and spout member 204 are moved longitudinally relative to one another by a suitable mounting means 206. In this embodiment, mounting means is a simple thread connection between outlet member 202 and spout member 204.

Outlet member 202 includes a base 208 and a 3-D tip 210. Tip 210 is provided with an opening 212 formed of four slots 214 which converge at the distal peak thereof as shown in FIG. 10. Spout member 204 includes a main body 216 similarly shaped to main body 48 of dispenser 28 and including a pedestal 218. At the top of pedestal 218 there are provided four curved, flexible ribs 220 which come together at a distal peak 222. Sealing between pedestal 218 and base 208 is provided by a seal collar 224 which engages the inside surface of base 208.

In operation, dispenser 200 functions broadly similar to dispenser 100. In particular, it will be appreciated that mounting means 206 is calibrated so that when dispenser 200 is in the closed position where outlet member 202 is fully screwed together with spout member 204, ribs 220 are positioned immediately below associated slots 214 to block/engage and hence seal slots 214. Thus, when it is desired to expel the product from dispenser 200, outlet member 202 is simply twisted relative to spout member 204 to effect a longitudinal relative movement so that ribs 220 are then spaced from slots 214. This provides a sufficient passage for the product to flow from inside of pedestal 218, past ribs 220 and out of slots 214 in a stream. A reverse twisting movement of outlet member 202 relative to spout member 204 then returns ribs 220 to a position sealing slots 214 when the user is finished expelling a desired amount of the product. Cleaning is then easily effected by wiping the surface of tip 210 and the surface of ribs 220 located in slots 214.

Figure 11:
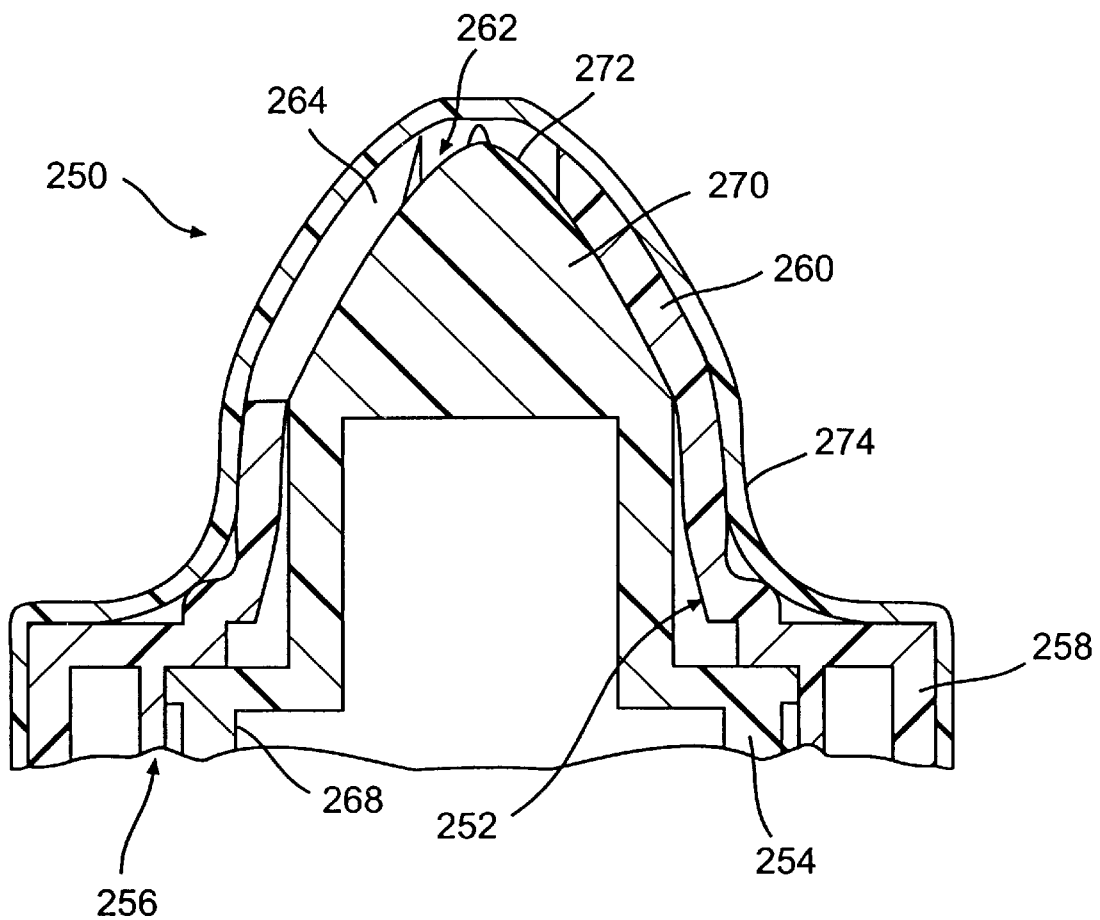
FIG. 11 is a front cross-sectional view of a fourth embodiment of a dispenser according to the present invention.

Depicted in FIG. 11 is a fourth embodiment of a dispenser 250. Dispenser 250 includes an outlet member 252 and a spout member 254. Outlet member 252 and spout member 254 are moved longitudinally relative to one another by a suitable mounting means 256. In this embodiment, mounting means 256 is a simple push-pull lock mechanism as previously described above with respect to dispenser 100 and thus is not described further.

Outlet member 252 includes a base 258 and a 3-D tip 260. Tip 260 is provided with an opening 262 formed of five slots 264 which converge at the distal peak thereof in the same manner as tip 40 of dispenser 28. Spout member 254 includes a main body (not shown) which is similarly shaped to main body 122 of dispenser 100 and a pedestal 268. At the top of pedestal 268 there is provided a solid dome 270 having a distal peak 272.

Provided around both outlet member 252 and spout member 254 is a shrink wrap member 274 which functions as a tamper-evidencing device in the same manner as tamper-evidencing device 140 of dispenser 100.

In operation, dispenser 250 functions broadly similar to dispenser 100. In particular, it will be appreciated that mounting means 256 is calibrated so that when dispenser

250 is in the closed position where outlet member 252 is fully pushed together with spout member 254, dome 270 is positioned immediately below associated slots 264 to block/engage slots 264 and to seal opening 262 in the same manner as dispenser 28. Thus, when it is desired to expel a product stream from dispenser 250, outlet member 252 is simply pulled apart from spout member 254 to effect a longitudinal relative movement so that dome 270 is then spaced from slots 264. This provides a sufficient passage for the product to flow from inside of pedestal 268, past dome 270 and out of slots 264. A reverse push movement of outlet member 252 relative to spout member 254 then returns dome 270 to a position blocking slots 264 when the user is finished expelling the product. Cleaning is then easily effected by wiping the surface of tip 260 and the surface of dome 270 located in slots 264. While the present invention has been described with respect to exemplary embodiments thereof, it will be understood by those of ordinary skill in the art that variations and modifications can be effected within the scope and spirit of the invention.

What is claimed is:

1. A closable dispenser which is attached to a container of a flowable product for dispensing of the product from the container comprising:
    an outlet member having a base and a 3-D tip having a 3-D opening therein, said 3-D tip having an outer convex shape and an inner concave shape and said 3-D opening having a plurality of slots radiating away from a central aperture at an apex of said tip;
    a spout member having a hollow main body which is fixed relative to the container, a stopper extending from said main body and having a convex, 3-D shape complementary to said 3-D opening of said tip, and a passage provided between said main body and said stopper; and
    a mounting means for movably mounting said base of said outlet member about said main body of said spout member for a relative movement of said outlet member and spout member between (a) an open position allowing flow of the product where said stopper is spaced interiorly from said 3-D opening and dispensing of the product from the container through said passage to said 3-D opening is permitted and (b) a closed position preventing flow of the product where said stopper is complementarily engaged with said 3-D opening of said tip so that most residual product is expelled from said tip and a 3-D surface which is easily cleaned of remaining residual product is provided.

2. A closable dispenser as claimed in claim 1:
    wherein said 3-D shape of said stopper is a solid dome.
3. A closable dispenser as claimed in claim 1:
    wherein said 3-D shape of said stopper is a plurality of ribs, with each said rib blocking a respective said slot when said base and said main body are in the closed position.
4. A closable dispenser as claimed in claim 3:
    wherein outer portions of said ribs are flush with an adjacent outer convex shape of said tip when said ribs block said slots.
5. A closable dispenser as claimed in claim 1:
    wherein said stopper is mounted to said main body by a plurality of legs with spaces between said legs providing said passage.
6. A closable dispenser as claimed in claim 1:
    wherein said mounting means mounts said base of said outlet member for a screw twist rotation about said main body of said spout member.

7. A closable dispenser as claimed in claim 1:
    wherein said mounting means mounts said base of said outlet member for a reciprocating movement along said main body of said spout member.
8. An apparatus for storage and dispensing comprising:
    a flowable product;
    a product container in which the flowable product is located, said product container having an open mouth and being collapsible; and
    a closable dispenser for dispensing of the product from said container when said container is collapsed, said dispenser including
        an outlet member having a base and a 3-D tip having a 3-D opening therein, said 3-D tip having an outer convex shape and an inner concave shape and said 3-D opening having a plurality of slots radiating away from a central aperture at an apex of said tip;
        a spout member having a hollow main body which is fixed relative to said mouth of said container, a stopper extending from said main body and having a convex, 3-D shape complementary to said 3-D opening of said tip, and a passage provided between said main body and said stopper, and
        a mounting means for movably mounting said base of said outlet member about said main body of said spout member for a relative movement of said outlet member and spout member between (a) an open position allowing flow of the product where said stopper is spaced interiorly from said 3-D opening and dispensing of the product from said mouth of said container through said passage to said 3-D opening is permitted and (b) a closed position preventing flow of the product where said stopper is complementarily engaged with said 3-D opening of said tip so that most residual product is expelled from said tip and a 3-D surface which is easily cleaned of remaining residual product is provided.

9. An apparatus for dispensing a flowable product as claimed in claim 8:
    wherein said 3-D shape of said stopper is a solid dome.
10. An apparatus for dispensing a flowable product as claimed in claim 8:
    wherein said 3-D shape of said stopper is a plurality of ribs, with each said rib blocking a respective said slot when said base and said main body are in the closed position.
11. An apparatus for dispensing a flowable product as claimed in claim 10:
    wherein outer portions of said ribs are flush with an adjacent outer convex shape of said tip when said ribs block said slots.
12. An apparatus for dispensing a flowable product as claimed in claim 8:
    wherein said stopper is mounted to said main body by a plurality of legs with spaces between said legs providing said passage.
13. An apparatus for dispensing a flowable product as claimed in claim 8:
    wherein said mounting means mounts said base of said outlet member for a screw twist rotation about said main body of said spout member.
14. An apparatus for dispensing a flowable product as claimed in claim 8:
    wherein said mounting means mounts said base of said outlet member for a reciprocating movement along said main body of said spout member.

15. A closable dispenser which is attached to a container of a viscous product for dispensing of the product from the container comprising:

an outlet member having a base and peaked tip, said tip having an inside surface which is smoothly and outwardly curved, an open apex and at least one slot radiating away from said apex toward said base;

a spout member having a hollow main body which is fixed relative to the container, a stopper extending from said main body and having an outer surface of curved shape complementary to said inside surface of said peaked tip, and a passage provided between said main body and said stopper; and a mounting means for movably mounting said base of said outlet member about said main body of said spout member for a relative movement of said outlet member and spout member between (a) an open position allowing flow of the product where said stopper is spaced interiorly from said open apex and said slot and dispensing of the product from the container through said passage to said open apex and said slot is permitted and (b) a closed position preventing flow of the product where said stopper is complementarily engaged with said open apex and said slot of said tip so that most residual product is expelled from said tip and a 3-D surface which is easily cleaned of remaining residual product is provided.

16. A closable dispenser as claimed in claim 15:

wherein said peaked tip includes a plurality of said slots radiating away from said apex toward said base, each of said slots having a proximal end spaced from said apex and one another.

17. A closable dispenser as claimed in claim 16:

wherein said stopper is a solid dome; and wherein said spout member includes a plurality of legs for mounting said solid dome to said main body with spaces between said legs providing said passage.

18. A closable dispenser as claimed in claim 17:

wherein said mounting means mounts said base of said outlet member for a screw twist rotation about said main body of said spout member.

* * * * *